United States Patent [19]
Fritz et al.

[11] Patent Number: 5,969,044
[45] Date of Patent: Oct. 19, 1999

[54] METHOD OF PACKAGING AIR- AND/OR MOISTURE-SENSITIVE MATERIALS AND FOR INTRODUCING THE PACKAGED MATERIALS INTO A REACTOR

[75] Inventors: Serge Fritz, Frankfurt am Main; Reinhold Feldmann, Halle, both of Germany

[73] Assignee: Metallgesellschaft Aktiengesellschaft, Frankfurt am Main, Germany

[21] Appl. No.: 09/057,070

[22] Filed: Apr. 8, 1998

Related U.S. Application Data

[63] Continuation-in-part of application No. 08/844,226, Apr. 18, 1997, abandoned.

[30] Foreign Application Priority Data

May 30, 1996 [DE] Germany .............................. 19621661

[51] Int. Cl.$^6$ .............................. C08J 5/18; C08L 53/02; B01J 19/00
[52] U.S. Cl. .......................... 525/99; 525/191; 525/237; 525/89; 525/98; 525/936; 525/941; 422/310; 428/543; 23/293 R
[58] Field of Search .................................. 525/89, 98, 99, 525/191, 237, 936, 941; 422/310; 428/543; 23/293 R

[56] References Cited

U.S. PATENT DOCUMENTS 5,605,996  2/1997  Chuu et al. .............................. 526/340

FOREIGN PATENT DOCUMENTS

| 0 487 858 A1 | 6/1992 | European Pat. Off. |
| 2 036 477 | 12/1970 | France |
| 431 949 | 9/1967 | Switzerland |
| 2 011 447 | 7/1979 | United Kingdom |
| 2 168 362 | 6/1986 | United Kingdom |

OTHER PUBLICATIONS

Patent Abstract of Japan; JP 58225146; Denki Kagaku Kogyo KK; Transparent Heat–Shrinkable Film; Dec. 27, 1983.
Patent Abstract of Japan; JP 06072469; Mitsubishi Materials Corp.; Sealing Body for Water Soluble Film . . . ; Mar. 15, 1994.
Derwent Abstract of Japanese Patent J 59 184620–A; Jun. 4, 1983.
Derwent Abstract of Japanese Patent J 0 1014–243–A; Jul. 7, 1987.
Derwent Abstract of Japanese Patent J 5 7021 449; Jul. 11, 1980.
Database WPI, Section Ch, Week 7745; Derwent Pub. Ltd., London, XP002038249; AN 77–80267Y.

*Primary Examiner*—Jeffrey C. Mullis
*Attorney, Agent, or Firm*—Herbert Dubno

[57] ABSTRACT

Process for airtight and/or moisture-proof packaging of air-sensitive and/or moisture-sensitive materials for the introduction of the packaged materials in a chemical reactor. Described is a process for the airtight and/or moisture-proof packaging of air-sensitive and/or moisture-sensitive materials in a foil and a method for introducing the packaged materials in a reactor, whereby the polymer foil is dissolved in an organic solvent.

16 Claims, No Drawings

METHOD OF PACKAGING AIR- AND/OR MOISTURE-SENSITIVE MATERIALS AND FOR INTRODUCING THE PACKAGED MATERIALS INTO A REACTOR

CROSS REFERENCE TO RELATED APPLICATION

This application is a continuation-in-part of application 08/844,226 filed Apr. 18, 1997, now abandoned.

FIELD OF THE INVENTION

The invention relates to a method for airtight and moisture-proof packaging of air-sensitive and/or moisture-sensitive materials by means of a soluble polymer foil and to a method for introducing the packaged material into a reactor by means of a soluble polymer foil.

BACKGROUND OF THE INVENTION

Air-sensitive and/or moisture-sensitive materials, such as alkali metal alcoholate and hydrides, are packaged for storage and transport purposes under protective gas, e.g. argon or nitrogen, in plastic foil, which is then hermetically sealed. The plastic foil used is for instance polyethylene (PE)-foil. Also air-sensitive and/or moisture-sensitive materials can be packaged in soluble polyurethane (PU)-foils or in soluble foils of ethylene-ethylvinyl-acetate (EVA). However PU foils have the disadvantage that decomposition products which are health hazards can result during the dissolution of the PU foils. In the case of EVA foils it is disadvantageous that they can be dissolved only in toluene which is a material hazardous to health and only at temperatures higher than approx. 60° C. In order to release the material packaged therein in a chemical reactor, one is obligated either to use toluene as a solvent as well as to insure that the material is heated to these temperatures, or the foil package has to be opened and the material has to be introduced into the reactor via a lock.

OBJECT OF THE INVENTION

It is therefore the object of the present invention to overcome the disadvantages of the state of the art and to create a method for packaging air- and/or moisture-sensitive materials, which in addition to being technically simple and cost-efficient and insuring that the package is airtight and moisture-proof, also allows for a simple introduction of the material into the chemical reactor. Thereby the package has to be easily soluble, which means that it has to be soluble in organic solvents at temperatures between 20 to 60° C., and that during dissolution no hazardous materials result.

SUMMARY OF THE INVENTION

Surprisingly it has been found that the problem can be solved with a polymer foil, whose composition is known from the references EP-A 487,858, GB-A 2168,362 and JP-A 52,115,855. This foil contains:

a) 30 to 99.5% by weight of a thermoplastic polymer, which consists of styrene-butadiene-copolymers with a content of bound styrene of 60 to 85% by weight and has a module of elasticity in tension of 1100 to 1800 MPa, and b) 0.5 to 70% by weight of a thermoplastic rubber, which consists of styrene-butadiene-copolymers with a content of bound styrene of 25 to 35% by weight and a module of elasticity in tension of 2.6 to 3.5 MPa.

The module of elasticity in tension of the thermoplastic polymer refers to a module of elasticity in tension measured according to ISO 527; the module of elasticity in tension of the thermoplastic rubber is measured here according to ISO 37. Surprisingly it has been found that due to the composition of the foil a technically sufficient air and humidity tightness is afforded, as well as a good solubility of the polymer foil in organic solvents, e.g. in diethyl ether, tertiary butylmethylene (MTBE), tetrahydrofuran (THF), dimethyl formamide (DMF), glycol ether, diethylene glycol-dimethyl ether, diisopropyl ether, dioxane, dibutyl ether, toluene, cyclohexane and xylene at a temperature of 20 to 60° C. The foil dissolves well in hexane and haptene at a temperature of 60° C. The maximal water-vapor permeability of the soluble polymer foil at room temperature typically lies within a range of 5 to 10 $g/m^2/24h/bar$ with reference to a temperature of 23° C. and a relative humidity of 85% towards 0%. The maximum permeability for oxygen typically ranges between 5500 and 6600 $cm^3/m^2/24h/bar$ at a temperature of 23° C. and a relative humidity of 0%. The polymer foil can also contain other substances in small amounts, such as processing' aids, plastifiers and antioxidants.

According to a preferred feature of the invention, in the soluble polymer foil serving as packaging material the content of thermoplastic polymer is 50 to 80%, by weight and the content of thermoplastic rubber is 20 to 50% by weight. This composition insures a good processing capability and strength of the polymer foil in the process of the invention.

According to a further feature of the invention in the soluble polymer foil the content of thermoplastic polymer is approx. 67% by weight and the content of thermoplastic rubber is approx. 33% by weight. In this composition the processability and the strength of the polymer foil are very good.

According to a further feature of the invention, the thermoplastic polymer has a content of bound styrene of 70 to 80% by weight and the thermoplastic rubber has a content of bound styrene of 28.5 to 30.5% by weight. With these two substances the polymer foil has a very good processability and strength when used in the process of the invention and the seal against air and humidity is relatively good. As a thermoplastic polymer a product of the BASF AG commercially known as STYROLUX can be used, and as thermoplastic rubber a product of Shell AG with the designation KRATON can be used. Particularly with a composition of approx. 67% by weight of a product of the STYROLUX type and approx. 33% by weight of a product of the KRATON type very good characteristics of the polymer foil are exhibited for use in the process of the invention. These products also do not pose any health problems when used as packaging. They are accepted by the Food and Drug Administration (FDA) in the USA and by the Federal Ministry of Health (BGA) in Germany and can be used in contact with food products or for pharmaceutical processes.

According to a further feature of the process of the invention the polymer foil has a thickness of 15 to 300 $\mu$m, particularly 50 to 100 $\mu$m.

According to yet another feature of the process of the invention the air-sensitive and/or moisture/sensitive material is an alkali metal alcoholate or a hydride.

According to a further feature of the process of the invention the air-sensitive and/or moisture-sensitive material is a lithium aluminum hydride ($LiAlH_4$) or sodium hydride (NaH).

According to a further feature of the process of the invention the air-sensitive and/or moisture-sensitive material is in the form of powder or granulate.

According to yet another feature of the invention the air-sensitive and/or moisture-sensitive material is introduced into a reactor by a method wherein a) the air-sensitive and/or moisture-sensitive material is packaged in the soluble polymer foil so that it is airtight and moisture-proof, b) the packaged air-sensitive and/or moisture-sensitive material is introduced in a chemical reactor which contains an organic solvent, and c) the soluble polymer foil is totally or partially dissolved in the organic solvent.

As a result of the dissolution of the polymer foil in the organic solvent contained in the chemical reactor, the therein contained air-sensitive and/or moisture-sensitive material is released in the reactor.

According to a further feature of the invention the organic solvent is diethyl ether, tertiary methyl-butyl ether (MTBE), tetrahydrofuran (THF), dimethyl formamide (DMF), glycol ether, diethylene glycol dimethyl ether, diisopropylether, dioxane, dibutyl ether, cyclohexane, toluene or xylene or a mixture of two or more of these substances.

According to a further feature of the invention the organic solvent is tetrahydrofuran (THF), dimethyl formamide (DMF) or toluene.

The object of the invention is further explained by the aid of the following example:

EXAMPLE

In the described soluble polymer foil lithium aluminum hydride was introduced. Subsequently the foil was closed by means of a seam-sealing machine or a heat-pulse sealing machine. The closed foil filled with lithium aluminum hydride was introduced in a chemical reactor. Due to the organic solvent contained in the chemical reactor the foil is dissolved and the lithium aluminum hydride is released for performing a reduction reaction.

What is claimed is:

1. A packaged air-tight and moisture-tight composition for use in a chemical reactor, which comprises:
   (1) an air-sensitive or moisture-sensitive substance; and
   (2) a packaging material comprising a polymer foil soluble in an organic solvent, said polymer foil comprises:
      a) 30 to 99.5 wt-% of a thermoplastic polymer, which consists of styrene-butadiene copolymers with a content of 60 to 85 wt-% bound styrene and which has a modules of elasticity in tension of 1100 to 1800 MPa, and
      b) 0.5 to 70% wt-% of a thermoplastic rubber, which consists of styrene-butadiene copolymers with a content of 25 to 35 wt-% bound styrene and which has a modules of elasticity in tension of 2.6 to 3.5 MPa, said packaging material surrounding said air-sensitive or moisture-sensitive substance to form an air-tight and water-tight seal around said air-sensitive or moisture-sensitive substance.

2. The packaged air-tight and moisture-tight composition defined in claim 1 wherein the air-sensitive or moisture-sensitive substance is an alkali alcoholate or alkali hydride.

3. The packaged air-tight and moisture-tight composition defined in claim 1 wherein the air-sensitive or moisture-sensitive substance is lithium aluminum hydride or sodium hydride.

4. The packaged air-tight and moisture-tight composition defined in claim 1 wherein the air-sensitive or moisture-sensitive substance is present in the form of a powder or granulate.

5. A process for protecting an air-sensitive or moisture-sensitive substance for use in a chemical reactor from air or moisture which comprises the step of packaging the air-sensitive or moisture-sensitive substance in a polymer foil soluble in an organic solvent, said polymer foil comprises:
   a) 30 to 99.5 wt-% of a thermoplastic polymer, which consists of styrene-butadiene copolymers with a content of 60 to 85 wt-% bound styrene and which has a modules of elasticity in tension of 1100 to 1800 MPa, and
   b) 0.5 to 70% wt-% of a thermoplastic rubber, which consists of styrene-butadiene copolymers with a content of 25 to 35 wt-% bound styrene and which has a modules of elasticity in tension of 2.6 to 3.5 MPa, said polymer-foil forming an air-tight and moisture-tight seal around said air-sensitive or moisture-sensitive substance to seal out air and moisture.

6. The process according to claim 5 in that in the soluble polymer foil the content of the thermoplastic polymer (a) amounts to 50 to 80% by weight of the polymer foil and the content of the thermoplastic rubber (b) amounts to 20 to 50% by weight.

7. The process according to claim 5 in that in the soluble polymer foil the content of the thermoplastic polymer (a) amounts to 67% by weight and the content of the thermoplastic rubber (b) amounts to 33% by weight.

8. The process according to claim 5 in that in the soluble polymer foil the thermoplastic polymer has a content of bound styrene of 70 to 80% by weight and the thermoplastic rubber has a content of bound styrene of 28.5 to 30.5% by weight.

9. The process according to claim 5 in that the soluble polymer foil has a thickness of 15 to 300 $\mu$m.

10. The process according to claim 9 in that the soluble polymer foil has a thickness of 50 to 100 $\mu$m.

11. The process according to claim 5 in that the air-sensitive or moisture-sensitive material is an alkali metal alcoholate or a hydride.

12. The process according to claim 11 in that the air-sensitive or moisture-sensitive material is lithium aluminum hydride ($LiAlH_4$) or sodium hydride (NaH).

13. The process according to claim 11 in that the air-sensitive or moisture-sensitive material is in the form of a powder or a granulate.

14. A process for introducing an air-sensitive or moisture-sensitive substance into a chemical reactor which comprises the steps of:
   (1) packing air-tight and moisture-tight an air-sensitive or moisture-sensitive substance in a polymer foil soluble in an organic solvent, said polymer foil comprising:
      a) 30 to 99.5 wt-% of a thermoplastic polymer, which consists of styrene-butadiene copolymers with a content of 60 to 85 wt-% bound styrene and which has a modules of elasticity in tension of 1100 to 1800 MPa, and
      b) 0.5 to 70% wt-% of a thermoplastic rubber, which consists of styrene-butadiene copolymers with a content of 25 to 35 wt-% bound styrene and which has a modules of elasticity in tension of 2.6 to 3.5 MPa;
   (2) introducing the air-sensitive or moisture-sensitive substance packed in the polymer foil according to step (1) into a chemical reactor which contains an organic solvent; and
   (3) dissolving wholly or partially the polymer foil in the organic solvent in the chemical reactor to liberate the air-sensitive or moisture-sensitive substance in the organic solvent.

15. The process defined in claim 14 wherein according to step (b) the organic solvent is diethyl ether, methyl-tert.-butylether, tetrahydrofuran, N,N-dimethylformamide, glycol ether, diethylene glycol dimethyl ether, diisopropyl ether, dioxane, dibutyl ether, cyclohexane, toluene, or xylene or a mixture of two or more thereof.

16. The process defined in claim 15 wherein the organic solvent is tetrahydrofuran, N,N-dimethylformamide or toluene.

* * * * *